United States Patent Office 3,829,521
Patented Aug. 13, 1974

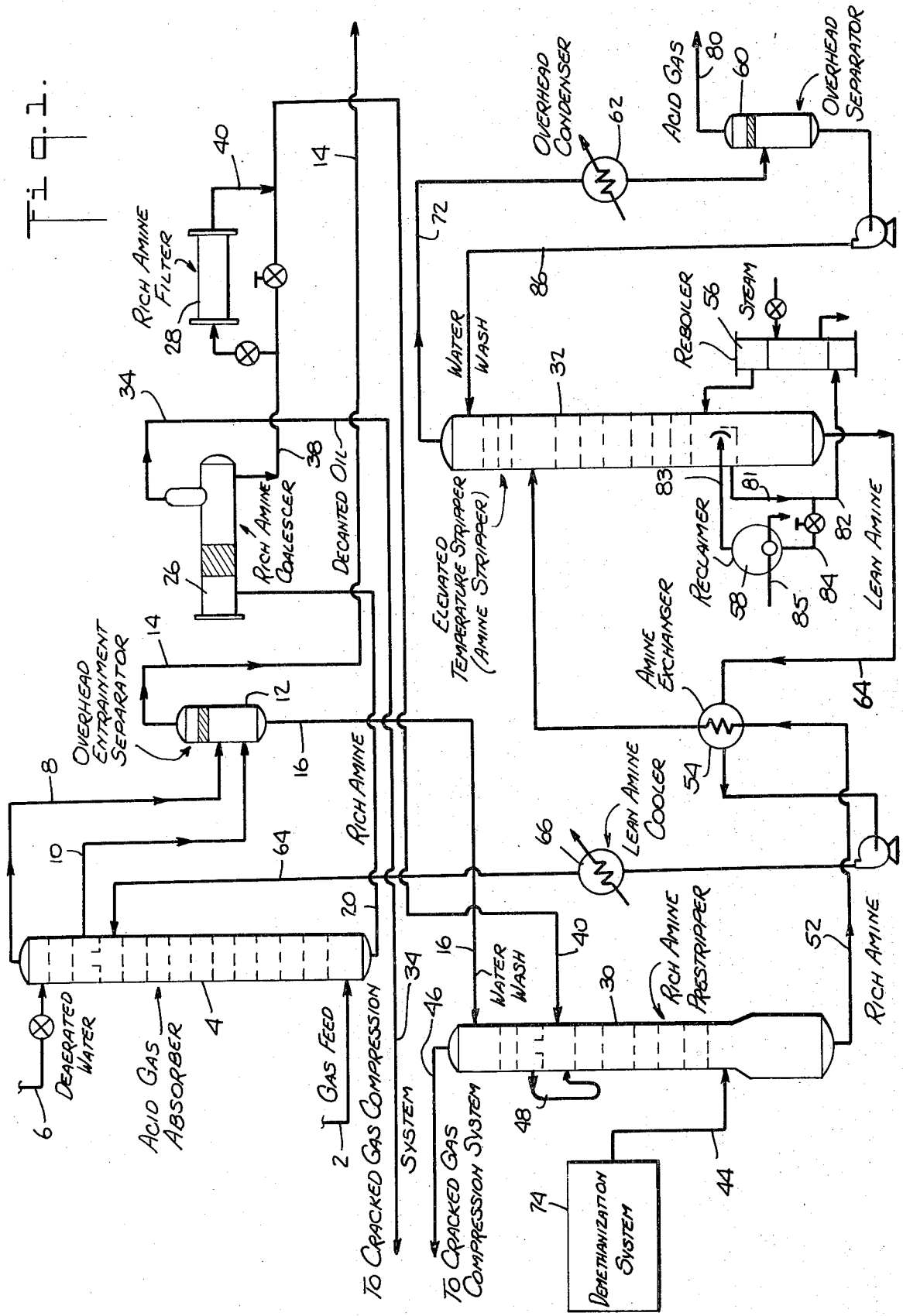

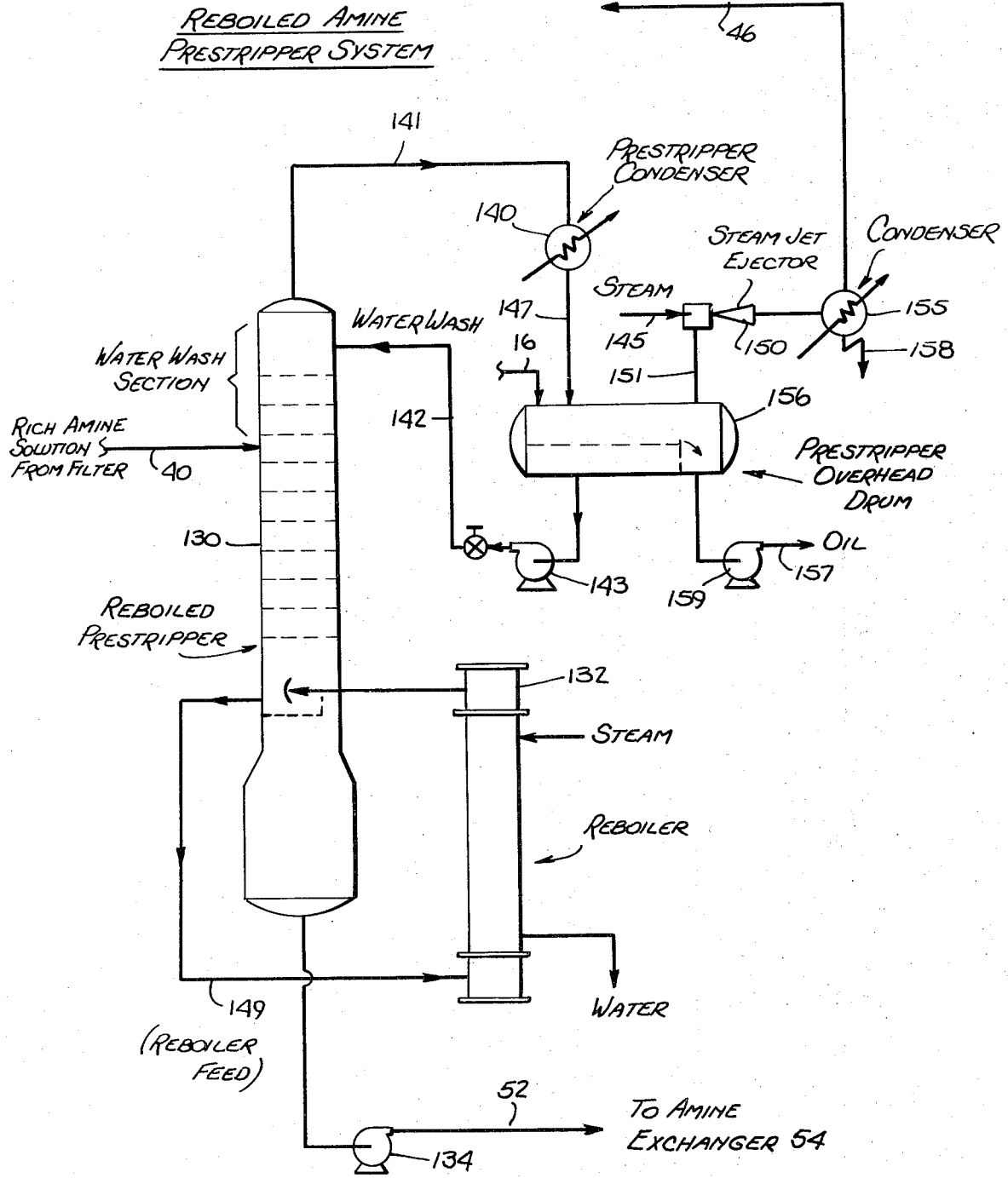

3,829,521
PROCESS FOR REMOVING ACID GASES
FROM A GAS STREAM
Ellis J. Green, Winchester, Mass., assignor to Stone & Webster Engineering Corporation, Boston, Mass.
Filed July 3, 1972, Ser. No. 268,650
Int. Cl. C07c 7/00
U.S. Cl. 260—677 A                15 Claims

ABSTRACT OF THE DISCLOSURE

Process and system for removing acid gases from a gas stream by absorption in aqueous amine solution and process and system for regenerating the amine. Acid gases, specifically $H_2S$ and $CO_2$, in the cracked gases from a pyrolysis furnace are absorbed by aqueous amine solution. The amine solution is then regenerated by coalescing and separating liquid $C_4$ and heavier hydrocarbons entrained in the amine solution, filtering from the amine solution solid particles if present, stripping from the amine solution almost all of the $C_4$ and heavier unsaturated hydrocarbons remaining therein, and finally stripping at elevated temperatures the acid gases from the amine solution by conventional means.

FIELD OF THE INVENTION

The invention relates to a process and system for removing acid gases, specifically hydrogen sulfide and carbon dioxide from hydrocarbon gas streams. The invention relates to an amine process for removing acid gases by absorption in an aqueous amine solution with means provided for regenerating the amine solution. The invention is particularly suitable for removing acid gases from the cracked gases produced in pyrolysis furnaces associated with an olefins plant.

BACKGROUND OF THE INVENTION

Description of the Prior Art

The cracked gas produced by pyrolysis cracking of hydrocarbon feedstocks usually contains undesirable components such as hydrogen sulfide, carbon dioxide, and traces of carbonyl sulfide. These undesirable components, termed in the industry acid gases, must be removed from the pyrolysis cracked gas. Otherwise, they would ultimately contaminate the ethylene, propylene, or other of the desired olefins plant products.

It has been a practice in the industry to remove these acidic components by scrubbing the pyrolysis cracked gas with an aqueous solution of caustic soda, NaOH. In large plants and in plants where the feedstock contains relatively high concentrations of sulfur compounds, as with some naphthas and most gas oils, the consumption of caustic soda becomes very great and the costs both of fresh caustic make-up and of spent caustic disposal become a significant percentage of the total production cost of the olefins plant products.

Practice has shown that in these cases it is usually more economical to employ a regenerative process to remove at least a portion of the acidic components. One particularly suitable conventional regenerative process for the removal of acid gases is the aqueous amine regenerative process. (Oil and Gas Journal, Aug. 21, 1967, pages 83–85.)

In the regenerative aqueous amine process aqueous solutions of monoethanolamine and diethanolamine are most commonly used as the regenerable solvents. Aqueous solutions of triethanolamine and methyldiethanolamine have also been used as regenerable solvents. In addition, glycol has been used in combination with any one of the regenerable solvents to provide a solution capable of simultaneously absorbing the acidic components and dehydrating gases.

As conventionally applied, the regenerative amine process consists firstly of an absorption step carried out in an absorption column at elevated pressure and near ambient temperature wherein the acidic components, principally $H_2S$ and $CO_2$, are absorbed by the aqueous amine.

As absorption occurs, these components react with the amine to form amine salts which are retained by the aqueous amine solution in a dissolved state.

The following reactions occurring with monoethanolamine and acid gas are given to illustrate the conventional regenerative process:

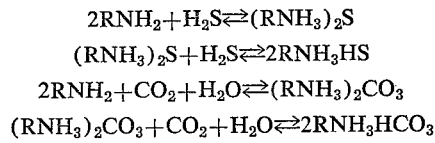

At near ambient temperatures, the reactions tend to proceed to the right, thus forming amine salts which are retained by the aqueous amine solution leaving the bottom of the absorber.

The amine solution so retaining the acidic components in the form of amine salts therein dissolved is commonly referred to as "rich amine solution." The amine solution fed to the top of the absorber column contains negligible acidic components and is, therefore, referred to as "lean amine solution."

The rich aqueous amine solution leaving the bottom of the absorber is then conventionally heated to elevated temperatures in an indirect heat exchanger and conventionally passed to a stripper tower, which also operates at elevated temperature.

As the rich aqueous amine solution is heated to elevated temperatures, the amine salts contained therein are reconverted to acid gas components, $H_2S$ and $CO_2$, and amine. This occurs because the reactions between the acid gas components and the amine are reversible. Hence, in the above illustrative reactions with monoethanolamine, the reaction shifts to the left at elevated temperatures thus causing $H_2S$ and $CO_2$ to be released from amine salts. The preferred elevated temperatures required to cause the reactions to shift are defined in the art for most amine solvents. For example, if monoethanolamine is used, temperatures of about 240° F. are generally required. The $H_2S$ and $CO_2$ which are released from the amine salts are conventionally stripped from the amine solution by distillation.

The stripping must also be carried out at the required elevated temperatures in order to prevent the reactions from going again to the right. The stripping is accomplished in a stripping column which operates usually at pressures slightly above atmospheric. This stripping column is conventional in the art and will hereinafter be referred to as the "elevated temperature stripper." It is more commonly termed in the art as the "amine stripper."

In practice, the elevated temperature stripper is provided with a bottoms reboiler to generate stripping vapor and an overhead condenser from which water-rich condensate is returned to the top of the tower as reflux. A few trays are generally provided above the feed to reabsorb stripped amine vapors that may be have vaporized into the stripped acid gas. The acid gas is taken overhead and delivered to a flare or vent stack, sulfur recovery unit or disposed of in any other suitable manner. The elevated temperature stripper is conventionally further provided with a reclaimer at the bottom of the tower. The reclaimer is a distillation vessel which is designed to process a small portion of the lean amine solution leaving the bottom of the stripper. The reclaimer is intended, in practice, to remove non-regenerable amine impurities formed principally by side reactions that occur with the amine and acid gas components. Typically, the reclaimer is provided with access means for the addition of soda ash to neutralize volatile acidic impurities.

In practice, it is intended that the reclaimer distill off the amine and water that is passed through it leaving the amine impurities behind to be flushed out with water.

The absorption step is carried out in conventional equipment comprised of a tower provided with appropriate packing or fractionating trays in order to assure intimate contacting of the cracked gas process stream with the lean aqueous amine solution. The pyrolysis cracked gas containing the acidic components, $H_2S$ and $CO_2$, is fed to the absorber near the bottom and the lean aqueous amine solution is fed to the absorber near the top. The purified cracked gas flows from the top of the absorber column.

The rich amine solution containing the acidic components in the form of dissolved amine salts flows from the bottom of the absorber. The rich amine solution is then heated to elevated temperatures in an indirect heat exchanger and fed directly to the elevated temperature stripper. Lean aqueous amine solution is taken from the bottom of the elevated temperature stripper, cooled by indirect heat exchange, and then fed to the absorber column.

Conventionally, the lean amine solution is cooled at least in part by indirect heat exchange with the rich amine solution leaving the bottom of the absorber column. Conventionally, for the preferred amine solvents, the lean amine solution is cooled to near ambient temperatures. For example, if monoethanolamine is used, it is known in the art that the absorber operates optimally at temperatures of about 80° F. to 100° F.

In the practice of treating pyrolysis cracked gases with such conventional regenerative amine processes, it has been found that serious equipment fouling frequently occurs.

It has been found in practice that the rich aqueous amine solution leaving the bottom of the absorber, contains $C_4$'s and heavier unsaturated hydrocarbons. These unsaturated hydrocarbons are found to be dissolved or both dissolved and entrained in the solution. A significant portion of these unsaturated hydrocarbons consists of butadiene, which is a polymerizable hydrocarbon, and to a lesser extent other polymerizable hydrocarbons such as, but not limited to, pentadiene, styrene, and other unsaturated hydrocarbons.

When the rich aqueous amine solution leaving the absorber is heated to the elevated temperatures required for amine regeneration, fouling of equipment occurs as a result of polymerization of these compounds.

Fouling caused by polymerization occurs in much of the elevated temperature process equipment, particularly on the stripper trays, in the stripper reboiler, and in the stripper feed heat exchanger equipment including associated process piping. The polymer deposits may become so extensive that frequent shutdown of the system is required in order to remove these deposits. In fact, the fouling caused by polymer formation is often so severe as to discourage the use altogether of the conventional amine process for the herein described service.

One prior art approach to diminishing fouling of the elevated temperature section of the amine process is to remove the $C_4$ and heavier unsaturated hydrocarbons from the cracked gas prior to feeding the cracked gas stream to the amine absorber. One such technique is the use of a front end depropanizer (Chemical Engineering Progress, Vol. 65, page 67, 1969). This approach, while sound with respect to the amine treating system, is often undesirable with respect to the overall olefins plant design.

SUMMARY OF THE INVENTION

In an amine system to remove acid gas from pyrolysis cracked gas, it is the principal object and purpose of this invention to reduce the rate of fouling of equipment by hydrocarbon polymerization in the elevated temperature section of the amine system.

A reduction of equipment fouling results in increased run length of the system which, in turn, improves the economics of the overall olefins plant. In particular, the invention is directed to reducing fouling of equipment without resorting to any significant change in the main processing sequence external to the acid gas removal system.

In the process of the invention, $C_4$ and heavier hydrocarbons, a portion of which are polymerizable, are removed from the rich amine solution after the acid gas absorption step, but prior to the elevated temperature amine regeneration step.

In the process of the invention, the $C_4$ and heavier hydrocarbons are removed by first coalescing those $C_4$ and heavier hydrocarbons which are entrained in the rich amine solution leaving the acid gas absorber and finally by removing almost all of the remaining dissolved and residually entrained $C_4$ and heavier unsaturated hydrocarbons from the rich amine solution by stripping the solution with a low molecular weight non-condensable gas.

The prestripping operation is preferably carried out at temperatures nearly the same as that required in the acid gas absorption step. The prestripping operation is preferably accomplished at pressures as low as possible, but yet high enough so that the rich amine solution need not be pumped to the elevated temperature equipment.

It has been found that conventional products of the olefins plant demethanization system, specifically methane rich gas and methane-hydrogen rich gas, are particularly suitable low molecular weight non-condensable stripping mediums, since they are conventionally available from the olefins plant low temperature purification system at a temperature level permitting direct use in the prestripping operation without requiring additional heating or cooling. Furthermore, it has been found that with respect to a conventional olefins plant, the quantity of stripping gas required in the prestripping operation is a very small percentage of the total quantity of methane or methane-hydrogen rich gas available. These facts allow for a simple and highly economical prestripping system.

BRIEF DESCRIPTION OF THE DRAWINGS

The invention will be more specifically described with reference to the drawings.

FIG. 1 is a schematic flow diagram of one embodiment of the invention; and

FIG. 2 is a partial schematic diagram illustrating a modified embodiment of the prestripper.

DESCRIPTION OF THE PREFERRED EMBODIMENT

The invention is particularly applicable to a regenerative amine process for removing acid gases from a hydrocarbon pyrolysis cracking effluent. Therefore, the invention will be described with reference to a pyrolysis cracking process.

The process system of the present invention, best seen in FIG. 1, is comprised essentially of pyrolysis gas purification equipment and amine regeneration equipment. The pyrolysis gas purification equipment consists of an acid gas absorber 4, an entrainment separator 12 and lines for transferring the various fluids.

The acid gas absorber 4 is conventional equipment and is designed to receive the pyrolysis cracked gas at the bottom and a lean amine aqueous solution at a point near the top directly below a water wash section.

The acid gas absorber 4 contains appropriate tower packing or trays to provide adequate contacting between the pyrolysis cracked gas and the lean amine solution. The acid gas absorber 4 includes an overhead line 8 through which the pyrolysis cracked gas, having been substantially freed of hydrogen sulfide and carbon dioxide, is removed from the tower.

The acid gas absorber 4 is provided with a line 6 to feed deaerated water to the top of this tower in order to reabsorb any amine that has vaporized or has been entrained in the gas leaving the top tray in the absorption section of the tower. A line 10 is also provided to transfer the deaerated water from the bottom of the absorber wash section to the separator drum 12. Line 20 delivers the rich amine solution to the coalescer 26.

The entrainment separator 12 is arranged in the system to receive the scrubbed gas from line 8 and the deaerated water wash liquid from line 10. A line 16 delivers the wash water from the entrainment separator 12 to the top of the prestripper 30. Also, a line 14 transfers the purified cracked gas from the separator 12 to downstream process equipment which separates the effluent gas into ethylene, propylene and/or other products. It should be noted that prior to further processing, the purified cracked gas from line 14 can be treated with caustic solution in conventional equipment (not shown) to decrease further the amount of any residual acid gas components remaining in this stream.

The amine regeneration equipment is comprised primarily of a rich amine coalescer 26, a filter 28, a rich amine prestripper 30, a conventional amine stripper 32 and a reclaimer 58.

The rich amine coalescer 26 is arranged to receive the rich amine solution from the bottom of the acid gas absorber 4 through line 20. The coalescer 26 serves to coagulate droplets or droplet aggregates of entrained liquid hydrocarbons present in the rich amine solution flowing through line 20. The coalesced liquid hydrocarbons are removed from the coalescer through an outlet line 34 and returned to upstream hydrocarbon processing equipment, such as a separator drum of a cracked gas compressor. A line 38 is provided to transfer the rich amine solution from the coalescer 26 to the filter 28 wherein iron sulfide particles are removed from the amine solution.

The filter 28 is conventional and includes filter medium such as diatomaceous earth.

An outlet line 40 is provided to deliver the filtered rich amine solution from the rich amine filter 28 to the prestripper 30.

In a service where the acid gas is essentially all carbon dioxide with only small amounts of $H_2S$, the amount of iron sulfide particles formed may be sufficiently low that the filter 28 can be by-passed in part or eliminated entirely. If the filter 28 is eliminated from the process, then the rich amine solution from the coalescer 26 flows directly to the prestripper 30.

The function of the prestripper 30 is to remove substantially all $C_4$ and heavier unsaturated hydrocarbons which are dissolved and residually entrained in the rich amine solution. The rich amine prestripper has access means for the delievery of deaerated wash water from the bottom of entrainment separator 12 through line 16.

A line 48 is provided to enable delivery of the water wash liquid from the upper section of the prestripper 30 to the top of the lower section of the tower.

A line 40 is provided for delivery of the rich amine solution from the filter 28 to the prestripper 30 at a point in the tower directly below the water wash section.

A line 44 is also provided for delivering to the prestripper 30 a low molecular weight non-condensable gas as the stripping medium. If the improved process of this invention is used within an olefins plant, then preferably the low molecular weight non-condensable gas is delivered to the prestripper from the olefins plant demethanization system 74. Specifically, it has been found that methane rich gas from the demethanization system 74 is a particularly suitable low molecular weight non-condensable gas. Essentially, the residue gas product or methane rich gas product from the demethanization system 74 consists entirely of varying amounts of hydrogen plus methane with only slight or trace amounts of ethylene and ethane. The conventional demethanization system 74 of an olefins plant processes the demethanizer overhead stream and other hydrogen and methane rich streams within an intricate heat exchange system in order to produce various purity hydrogen, methane and hydrogen-methane products.

An overhead line 46 is provided to deliver the overhead from the rich amine prestripper 30 to an appropriate suction drum of the cracked gas compression system wherein the pressure is lower than that of the rich amine prestripper 30. The cracked gas compression system is an integral part of any conventional olefins plant. The overhead from the rich amine prestripper 30 is comprised essentially of the stripping medium and substantially all of the $C_4$ and heavier hydrocarbons that were dissolved and residually entrained in the rich amine feed to the prestripper. The rich amine prestripper 30 operates preferably at a temperature at least as low as the amine absorber temperature and a pressure preferably at least high enough that the prestripper bottoms stream 52 can be fed to conventional heat exchanger 54 and elevated temperature stripper 32 without need of a pump. Under some conditions, it may be advantageous to operate the prestripper 30 at lower pressures; and with this embodiment a pump or pumps would be required to deliver the solution through the exchanger 54 to the elevated temperature stripper 32.

Typically, if the stripping gas is obtained from an olefins plant demethanization system 74, it is conventionally available from the demethanization system at about 45° F. and about 80 to 100 p.s.i.g. The rich amine stream 40 and the water wash stream 16 are typically at a temperature of about 100° F. if monoethanolamine is used. Hence, the prestripper 30 operates within the temperature limits of these three streams. The tower is conveniently operated at a pressure of about 60 p.s.i.g.

The prestripper 30 is provided with adequate number of fractionating trays or sufficient packing to accomplish the desired degree of stripping.

A line 52 is provided to pass the stripped rich amine from the prestripper 30 to the amine exchanger 54 wherein it is heated in conventional manner to the elevated temperature required for amine regeneration. The heated solution is then delivered to the elevated temperature stripper 32. The elevated temperature stripper 32 is conventional in design and is equipped with a reboiler 56 to generate the necessary stripping vapors. The elevated temperature stripper is further provided with a reclaimer 58.

The reclaimer 58 is conventional and is essentially a small distillation vessel provided to remove principally non-volatile amine impurities from the lean amine stream leaving the bottom of the elevated temperature stripper 32. Generally about 3% of the total amine solution circulating through line 64 is processed in the reclaimer 58.

A line 81 is provided to remove the lean amine solution from the bottom tray of the elevated temperature stripper 32. A line 84 is provided to deliver to the reclaimer 58 a small portion of the lean amine solution flowing through line 81. A line 83 is provided to return to the stripper 32 the amine and water vapors evolved during the batch distillation process occurring in the reclaimed 58.

A line 82 is provided to deliver to the reboiler 56 the greater portion of the lean amine solution in line 81. The reclaimer conventionally is provided with access means not shown so that soda ash, or the equivalent, can be added to the reclaimer 58 in order to neutralize volatile acidic impurities before they can be distilled back to the stripper 32. During the batch distillation, a sludge of the non-volatile amine impurities accumulates in the reclaimer vessel. The sludge is periodically flushed out with water; a line 85 is provided for this purpose.

An overhead condenser 62 is provided to generate reflux condensate which is returned to the top of the elevated temperature stripper 32. The condensate reflux primarily reabsorbs amine vapor that is present in the vapor stream flowing up through the elevated temperature stripper 32 to the overhead line 72. The acid gas components in the tower overhead are separated from the condensate liquid in a separator drum 60. A line 80 is provided so that the acid gas can flow from the top of the separator drum 60 and a line 86 is provided to return the condensate to the top of the elevated temperature stripper 32. The lean amine is removed from the bottom of stripper 32 through line 64. The line 64 is arranged to pass the lean hot amine solution through the hot side of the amine exchanger 54 wherein it is cooled by heat exchange with the rich amine solution which is passed to the exchanger 54 through line 52. The lean amine solution is additionally cooled to about 100° F. in amine cooler 66, or equivalent, prior to delivery to the acid gas absorber 4.

In operation, the pyrolysis cracked gas is taken from the cracked gas compression system, typically after the third stage of compression, is cooled and processed in equipment not shown such that the resulting cracked gas feed to the amine absorber 4 is at a temperature of 100° F. and 20° F. to 40° F. above its dew point. The cracked gas feed to the absorber 4 is at a pressure of about 240 p.s.i.a. A lean amine solution is delivered through line 64 to the acid gas absorber 4 and introduced at a point directly below the water wash section at the top of the tower.

The pyrolysis cracked gas flows up through the acid gas absorber 4 and is contacted by the lean amine solution which flows down through the tower.

The lean amine solution absorbs and reacts with the acid gas components contained in the pyrolysis cracked gas. The rich amine solution leaves the acid gas absorber through line 20. The purified pyrolysis cracked gas is washed with deaerated water in the top section of the amine absorber to reabsorb amine vapors that are present in the gas. The washed gas then passes overhead from the absorber through line 8 to the entrainment separator drum 12 operates at essentially the same temperature and pressure as the absorber, that is, at 100° F. and about 240 p.s.i.a. The deaerated wash water is passed through line 10 to the separator drum 12 from which it flows to the rich amine prestripper through line 16. The pyrolysis cracked gas passes overhead from the entrainment separator through line 14 to further treating and processing facilities of the olefins plant.

The rich amine solution passes from the bottom of the acid gas absorber 4 to the rich amine coalescer 26. The rich amine coalescer 26 operates at essentially the same temperature as the acid gas absorber 4 and only several pounds per square inch lower pressure than the acid gas absorber.

The rich amine coalescer 26 serves to coagulate and remove from the aqueous phase those $C_4$ and heavier hydrocarbons carried by the rich amine solution as a separate liquid phase either in the form of small entrained droplets or large liquid aggregates.

In cases where the amount of entrained liquid formed is small, the coalescing step while generally desirable, may be omitted from the process.

The entrained hydrocarbons are coagulated in the rich amine coalescer 26 and removed through line 34 to upstream processing equipment at lower pressure such as the 2nd stage discharge separator drum of the olefin's plant cracked gas compression system.

The rich amine solution flows from the rich amine coalescer 26 through line 38 and is passed through a filter 28. The filter removes solid particles such as iron sulfide that may have been formed in the acid gas absorber 4. In certain circumstances, such as when the absorber feed gas in line 2 contains small amounts of hydrogen sulfide, iron sulfide particles will not form in sufficient quantity, thus filtering may not be required. Under such circumstances, the filtering step can be partially by-passed or eliminated entirely.

The filtered rich amine is delivered to the rich amine prestripper 30 at a location near the top of the tower but below the water wash section. The rich amine solution enters the prestripper tower 30 at about 100° F. A stripping medium enters the tower 30 at the bottom through line 44. The stripping medium is a low molecular weight non-condensable gas. It is preferable that the rich amine prestripper 30 be operated at a temperature at least as low as the acid gas absorber temperature so that the reactions between the acid gas and the amine will not be reversed and acid gases evolved in this piece of equipment. As shown in FIG. 1, a particularly suitable stripping medium has been found to be methane rich gas or hydrogen-methane rich gas produced in the demethanization system of the conventional olefins plant. These product gases of the demethanization system have the non-condensable low molecular weight properties required of the stripping gas and are conventionally available from the olefins plant demethanization system at a temperature level desired in the prestripper 30. The stripping gas from the olefins plant demethanization system is passed directly to the prestripper 30 at a temperature of about 45° F. Contact of the stripping gas with the rich amine solution from line 40 and water from line 48 results in a temperature in the stripping section of the prestripper at least as low as the operating temperature of the acid gas absorber, but not impractically low.

The resulting operating temperature of the prestripper is at about ambient temperatures.

The prestripper 30 functions to strip out and thereby remove from the rich amine solution substantially all $C_4$ and heavier unsaturated hydrocarbons that are dissolved and residually entrained in the solution.

In the embodiment of FIG. 1, the tower operates at a pressure of 60 pounds per square inch gauge which is high enough that the stripped solution from the base of the prestripper can be fed through the rich amine-lean amine exchanger 54 to the top of the elevated temperature stripper 32 without need of a pump.

The stripping gas and stripped hydrocarbon vapors flowing up through the prestripper 30 are scrubbed in the water wash section at the top of the tower in order to minimize amine loss. The washed overhead gas is then delivered to an upstream hydrocarbon processing location which is at lower pressure. In the embodiment depicted in FIG. 1, the vapors leaving the top of the rich amine prestripper 30 are sent to the olefins plant second stage compressor suction separator. The rich amine, after prestripping, leaves the stripper 30 through line 52 and is heated in the rich amine-lean amine exchanger 54 to the required elevated temperature for reversal of the amine-acid gas reactions to occur. The heated solution is delivered from the exchange 54 to the conventional elevated temperature stripper 32. The stripper 32 is operated at a pressure of about 15 pounds per square inch gauge. The temperature range in the stripper 32, from top to bottom, is about 240° F. to 260° F. and will vary somewhat depending on the type of amine used.

Sufficient vapor is generated in the conventional steam heated reboiler 56 and a sufficient number of fractionating trays are provided in the stripper 32 to accomplish the stripping of acid gas components from the amine solution. A portion of the lean amine solution leaving at near the bottom of the stripper 32 is processed in the reclaimer 58 to remove amine impurities from the solution. About 3% of the total amine solution circulating through line 64 is batch distilled in the reclaimer 58.

The water vapor generated by the reboiler 56 and the acid gas stripped from solution pass up through the tower, are scrubbed with water in the top section of the tower and then pass overhead through the condenser 62 wherein the water vapor condenses. The cooled overhead stream passes to the overhead separator drum 60. The acid gas flows overhead from the drum through line 80 and the liquid condensate flows from the bottom of the drum through line 86 and is pumped to the top of the stripper 32. This liquid condensate contacts the gas passing up through the top section of the tower and thereby reabsorbs amine vapor that are present in the gas.

The lean amine solution leaves the bottom of the stripper 32 through line 64 and is cooled in the lean amine-rich amine heat exchanger 54 and further cooled to a temperature of 100° F. in additional exchangers, such as the amine cooler 66. At this temperature, the lean amine solution is suitable for reacting with the acid gas components contained in the pyrolysis cracked gas stream fed to the acid gas absorber 4. Thus, the lean amine solution at 100° F. is returned to the acid gas absorber 4 through line 64.

The improved process of the invention has been described with reference to a hydrocarbon pyrolysis plant for olefins production.

The amine process, as practiced in the art, is used frequently to remove acid gas components from hydrocarbon gas streams generated by other means or through other processes. The amine process has been used to remove acid gas components from hydrocarbon gas streams, such as natural gas and oil gas flashed from crude oil.

Therefore, the improved process of the invention, though described with reference to a pyrolysis cracked gas stream may be equally suitable in treating other gases wherein polymerizable hydrocarbons are formed in or carried by the rich amine solution leaving the acid gas absorption step of the amine process.

An alternative embodiment of the process of the invention is illustrated in FIG. 2 wherein the system of the invention is provided with a reboiled prestripper 130 in place of the prestripper 30. The reboiled prestripper 130 is equipped with a reboiler 132 which conveniently uses steam or an equivalent heat source to provide the required reboiler heat duty in order to generate sufficient amounts of stripping vapors. A line 149 delivers reboiler feed from the bottom of the reboiled prestripper 130 to the reboiler 132. The rich amine prestripper 130 is operated under a vacuum in order to maintain the temperature throughout the tower low enough to prevent any significant reversal of the acid-gas amine reactions. In this embodiment conventional evacuation equipment is provided to recompress the overhead vapor into line 46 and a pump 134 is provided to transfer the liquid from the bottom of the tower to the amine exchanger 54 and the elevated temperature stripper 32.

Suitable equipment for recompressing the overhead vapor is arranged in combination with the water wash equipment associated with the prestripper 130.

A prestripper condenser 140, a prestripper overhead drum 156, steam jet ejectors 150 and a steam condenser 155 are connected to deliver prestripper overhead gas to the cracked gas compression line 46 and to provide water wash reflux to the prestripper 130.

A line 141 from the top of the prestripper 130 delivers prestripper overhead to the hot side of the prestripper condenser 140 to cool and condense water from the overhead. A line 147 is provided to deliver the prestripper overhead vapor and condensate from the condenser 140 to the prestripper overhead drum 156. Also, wash water liquid from the system overhead entrainment separator 12, shown in FIG. 1, is delivered through line 16 to the prestripper overhead drum 156.

The steam jet ejectors 150 are located in the vapor outlet line 151 of the prestripper overhead drum 156 to remove the vapor therefrom and deliver it to the cracked gas compression line 46. Steam is delivered to the steam jet ejector through line 145 and a condenser 155 with condensate discharge line 158 is provided to condense the steam from the ejector 150.

A line 142 equipped with a pump 143 delivers water from the prestripper overhead drum 156 to the top of the prestripper 130 to serve as reflux for reabsorbing amine vapors in the top of the prestripper 130.

A line 157 and a pump 159 are provided to facilitate removal of $C_4$ and heavier hydrocarbons that separate out and form a separate oil phase in the prestripper overhead drum 156.

It has been found that the reboiled prestripper 130 will perform suitably in the pyrolysis cracking service if operated at a temperature less than 150° F., preferably from 125° to 140° F., and pressures of 3 p.s.i.a. or less.

The purpose of the reboiled prestripper 130 is identical to that of the prestripper 30 and all other equipment and process conditions are maintained similarly to those of FIG. 1.

Particular examples of a processing operation employing the invention are set forth as follows:

Example 1

An olefins plant designed to produce 200,000 MTA ethylene from a naphtha at 25 wt. percent yield requires about 216,000 lb./hr. naphtha feed. The quantity of cracked gas produced is typically about 7,200 lb. mols/hr. If the feed stock contains 0.1 wt. percent sulfur, and if 65% of this is converted to $H_2S$, then the cracked gas will contain 4.4 mols/hr. $H_2S$. The quantity of $CO_2$ in the cracked gas is 9.8 mols/hr.

Removal of these constituents by caustic alone requires caustic make-up (on the basis of 80% utilization) of 11.6MM lb. NaOH per year. At 3 cents/lb., its value would be about $350,000 per year.

Acid gas removal in the olefin plant by an amine unit requires circulation of 20,000 lb./hr. or 1,000 mols/hr. of 12 wt. percent aqueous monoethanolamine solution.

The gas to the absorber contains 10 mol percent $C_4$ and heavier components. Thus, with a total pressure of 250 p.s.i.a., the partial pressure of the $C_4$ and heavier components in the gas is about 25 p.s.i.a. The corresponding average solubility of these components in the aqueous solution at 100° F. is about 0.00044 mol fraction. The quantity of $C_4$ and heavier hydrocarbons dissolved in the rich amine is therefore 0.00044 (1,000)=0.44 mol/hr.

To achieve 90% stripping of the dissolved $C_4$ and heavier hydrocarbons with one theoretical stage and a tower pressure of 75 p.s.i.a. the following applies:

The mol fraction of $C_4$'s and heavier hydrocarbons in the aqueous amine solution leaving the prestripper is 0.00044(1.0–0.90)=0.000044. The vapor-liquid equilibrium constant, K, for these hydrocarbons=$H/P$=57,000/75=760, where H is the Henry law constant. The mol fraction of the $C_4$ and heavier hydrocarbons in the vapor leaving the prestripper is then equal to 760 (0.000044) =0.0334. The mols of $C_4$ and heavier hydrocarbons in the vapor leaving the prestripper equals 0.44(0.90)=0.396 mol/hr. Hence, the quantity of stripping gas required equals 0.396(1.0−0.0334)/0.0334=11.4 mols/hr.

This is a very small quantity compared to either the total quantity of cracked gas (7,200 mols/hr.) or to the total quantity of residue gas available (approx. 1.1 mol/ 100 lb. naphtha feed=2,380 mols/hr.).

A quantity of stripping gas several fold that of 11.4 mols/hr. can be used without seriously affecting adversely other parts of the compression and recovery system.

In view of the relatively small flows of both rich amine (about 40 g.p.m.) and stripping gas, a small packed tower less than 2 ft. diameter is satisfactory for the prestripper.

Example 2

An olefins plant is designed to produce 300,000 MTA ethylene from gas oil at an ethylene yield of 23 wt. percent, based on ethane recycle cracking. The corresponding feed rate is 352,000 lb./hr. Based on a sulfur content of 1.5 wt. percent in the feed stock and 35% conversion of feed sulfur to $H_2S$, the quantity of $H_2S$ in the cracked gas is 54.5 mols/hr. The quantity of $CO_2$ in the cracked gas is 10.0 mols/hr.

Therefore, the total quantity of acid gas is 64.5 mols/hr. in approximately 9,800 mols/hr. cracked gas. The concentration of acid gas in the cracked gas is (64.5/9,800) 100=0.66 mol percent.

At 250 p.s.i.a. total pressure, the partial pressure of the acid gas is 1.65 p.s.i.a. For essentially complete absorption, about 64.5/0.02=3,225 mols/hr. 12% MEA solution is required, or 64,500 lb./hr. (about 130 g.p.m.). The quantity of $C_4$ and heavier hydrocarbons dissolved in the rich solution is about 0.00044(3,225)=1.42 mols/hr.

For 95% stripping of $C_4$ and heavier hydrocarbons with two theoretical plates, a stripping factor ($S=VK/L$) of about 4.0 is required, where V and L are the molal flow rates of vapor and liquid respectively.

For a prestripper operating pressure of 25 p.s.i.a. (P), $K=H/P=57,000/25=2,280$, where H is the Henry Law Constant. The vapor to liquid molal ratio required is $V/L=S/K=4.0/2,280=0.00175$, and the quantity of stripping vapor is about 0.00175(3,225)=5.65 mols/hr. For an operating pressure of 75 p.s.i.a., this quantity would be (75/25)(5.65)=17.0 mols/hr.

I claim:

1. In the process for removing acid gases from gaseous hydrocarbons wherein the gaseous hydrocarbons are contacted in an absorption zone with a lean aqueous amine absorption solution to remove the acid gases therefrom thus forming a rich aqueous amine solution, which rich aqueous amine solution contains $C_4$ and heavier unsaturated hydrocarbons as a result of contacting the lean aqueous amine solution and the gaseous hydrocarbon in the absorption zone; and, wherein the rich aqueous amine solution is regenerated by amine stripping to become lean aqueous amine solution, the improvement comprising:

delivering the rich aqueous amine solution from the absorption zone to a rich amine prestripping zone;

delivering a low molecular weight noncondensable gas to the rich amine prestripping zone;

passing the stripping medium and the rich aqueous amine solution through the prestripper in countercurrent flow;

removing from the prestripping zone, the stripping medium with the $C_4$ and heavier unsaturated hydrocarbons stripped from the rich aqueous amine solution; and delivering the rich aqueous amine solution which has been prestripped of $C_4$ and heavier unsaturated hydrocarbons to the amine stripping equipment.

2. A process as in claim 1 further comprising the step of coalescing the rich aqueous amine solution from the absorption zone to remove entrained liquid hydrocarbons therefrom prior to delivering the rich aqueous amine solution to the prestripper zone.

3. A process as in claim 1 further comprising the step of coalescing the rich aqueous amine solution from the absorption zone to remove entrained liquid hydrocarbons therefrom prior to delivering the rich aqueous amine solution to the prestripper zone.

4. A process as in claim 1 further comprising the step of filtering the rich aqueous amine solution which leaves the absorption zone prior to delivering the rich aqueous amine solution to the prestripping zone.

5. A process as in claim 4 further comprising the step of filtering the rich aqueous amine solution which leaves the coalescer prior to delivering the rich aqueous amine solution to the prestripper zone.

6. A process as in claim 1 wherein the rich amine prestripper zone is a tower operated at a temperature of about 100° F. and a pressure of about 60 pounds per square inch gauge.

7. A process as in claim 1 wherein the rich amine prestripper zone is a tower operated at a temperature of about 100° F. and a pressure of 60 pounds per square inch gauge.

8. A process as in claim 1 wherein the rich aqueous amine solution from the prestripper zone is passed in heat exchange relationship with the lean aqueous amine solution from the amine stripper prior to delivery of the rich aqueous amine solution to the amine stripper equipment.

9. A process as in claim 7 wherein the rich aqueous amine solution from the prestripper zone is passed in heat exchange relationship with the lean aqueous amine solution from the amine stripper prior to delivery of the rich aqueous amine solution to the amine stripper equipment.

10. A process as in claim 5 wherein the rich amine prestripper is provided with a water wash section at the top.

11. A process as in claim 9 further comprising the steps of recycling the regenerated lean aqueous amine solution to the absorption zone and further cooling the lean aqueous amine solution in a lean amine cooler after it has been passed in heat exchange relationship with the rich aqueous amine solution.

12. In the process for removing acid gases from gaseous hydrocarbons wherein the gaseous hydrocarbons are contacted in an absorption zone with a lean aqueous amine absorption solution to remove the acid gases therefrom thus forming a rich aqueous amine solution, which rich aqueous amine solution contains $C_4$ and heavier unsaturated hydrocarbons as a result of contacting the lean aqueous amine solution and the gaseous hydrocarbon in the absorption zone; and, wherein the rich aqueous amine solution is regenerated by amine stripping to become lean aqueous amine solution, the improvement comprising:

delivering the rich aqueous amine solution prior to said amine regeneration to a reboiled prestripper tower which operates under vacuum and reboils the prestripper bottoms at a temperature of less than 150° F., prestripping $C_4$ and heavier unsaturated hydrocarbons from the rich aqueous amine solution in the reboiled prestripper.

13. A process as in claim 12 further comprising the step of coalescing the rich aqueous amine solution from the absorption zone to remove entrained liquid hydrocarbons therefrom prior to delivering the rich aqueous amine solution to the prestripper tower.

14. A process as in claim 13 further comprising the step of filtering the rich aqueous amine solution which leaves the coalescer prior to delivering the rich aqueous amine solution to the prestripper tower.

15. A process as in claim 12 wherein the pressure in the reboiled prestripper tower is less than 3 p.s.i.a and the temperature is between 125° and 140° F.

References Cited

UNITED STATES PATENTS

| | | | |
|---|---|---|---|
| 3,598,881 | 8/1971 | Kniel et al. | 260—683 |
| 3,347,621 | 10/1967 | Papadopoulos et al. | 208—341 |
| 2,946,652 | 7/1960 | Bloch | 423—228 |
| 3,003,008 | 10/1961 | Fleming et al. | 260—677 |
| 3,100,680 | 8/1963 | Shaw et al. | 208—236 |
| 3,696,162 | 10/1972 | Kniel | 260—677 |

DELBERT E. GANTZ, Examiner

C. E. SPRESSER, Jr., Assistant Examiner

U.S. Cl. X.R.

208—236, 289, 341, 342, 343, 346; 260—681.5 R, 683 R; 423—228